UNITED STATES PATENT OFFICE.

RALPH W. CROCKER, OF CHICAGO, ILLINOIS.

FOOD PRODUCT AND PROCESS OF PREPARING SAME.

1,388,699.  Specification of Letters Patent.  Patented Aug. 23, 1921.

No Drawing.   Application filed May 26, 1919.  Serial No. 299,898.

*To all whom it may concern:*

Be it known that I, RALPH W. CROCKER, a citizen of the United States, residing at Chicago, in the county of Cook and State of Illinois, have invented certain new and useful Improvements in Food Products and Processes of Preparing the Same, of which the following is a specification.

This invention relates to improvements in food products and processes, and it relates to processes for packing meat more particularly. It is an object of the invention to provide for the utilization of nutritious meats which heretofore have been regarded with more or less disfavor and hence have had but limited market and could not be handled commercially with advantage. It is another object, incidental to the foregoing, to provide a new opening for the commercially profitable disposition and the useful consumption of skimmed milk, which is a dairy product hitherto regarded as somewhat in the nature of waste, and which therefore sells at a low price, although containing nutritious food values. The jowls of hogs and of beef, for example, are too dark to be salable on any large scale, except for bologna sausage or the like; but I have discovered that milk can be combined with this meat in such a way that the combination can be packed and marketed in cans; that the addition of the milk improves the quality of the meat in the direction of making it more attractive to the eye; and that in doing this it is not necessary to use whole milk, but that the fat of the milk can be separated and used for commercial products, and the resulting skim milk containing the casein can be used successfully for combination with the meat. The net result is the making of a nutritious product from very low cost meat and low cost milk which has a value in nutriment and in the market quite out of proportion to the value of its ingredients as commonly estimated by market prices, and which has the utility of being a means for the introduction to consumption of parts of meat and milk which would not ordinarily be so used.

The invention is practised by putting the meat and milk and a little flour, preferably potato flour, together through a chopping machine, in the course of which operation the meat is cut rather fine and the milk is thoroughly incorporated. This mass then is filled into shallow molds, each being an aliquot fraction of the size of the can in which the product is to be packed, and is immersed in hot water for a few minutes. This makes each small mass hang together, so that it can be handled without changing shape, and can be fried in deep fat if desired. Each can may then be filled with these individual masses, sealed and "processed" in the usual way. The processing ordinarily used involves a cooking by steam for an hour or more, so that when the can is opened by the ultimate consumer it needs only to be warmed to be ready for eating.

The following example may be taken as illustrating the practice of the invention. Suitably wholesome and nutritious meat, which may be of certain cuts that are so dark in color as to be unmarketable except at a low price, is to be finely cut and mixed with skim milk thoroughly. This may be done by chopping and mixing the raw meat and milk together in a chopping machine, which may be preferably of the type in which blades rise and fall in a chopping bowl, like the so-called Buffalo chopper. Under these circumstances, the meat seems to absorb the milk; and the toughness, if any, is reduced by the fine cutting, and the moisture. Potato flour may be incorporated, a quantity which I have found sufficient being about one-fourth of an ounce to the pound of milk and meat. When this material has been sufficiently cut and mixed to uniformity and pressed together to force out air that may be between the particles or fibers of meat, it may be molded into thick disks which may be of diameter corresponding to the cross-section of the cans in which they are to be packed, and of sufficient thickness so that the mold may hold one-half, one-third or other aliquot fraction of the quantity which will fill the can that is to be marketed. A mold would be of substantially the same shape as the can, but shallower. The masses thus molded are then to be fixed in the molded shape. This is conveniently done by putting them under water at a temperature of about 140°, for a time for which I have found twenty minutes suitable. A simple method is to set the molds in a wire basket and immerse the whole in water for the required time. This stiffens or sets the mass in each mold; a sort of skin is formed which prevents adhesion of contracting masses; and incidentally a slight shrinkage occurs so that the mass will leave the mold easily, yet substantially without change of shape or size. It is preferable, but not necessary, to fry these fractional masses, in deep fat, enough to cauterize them superficially. This cauterizing makes the skin more effective to prevent adhesion of one to another, when they are later in contact during the cooking or "processing," but leaves the mass at this stage rather raw and incompletely cooked through its body. The said skin—inclosed fractional masses, either superficially cauterized or raw, are then assembled in the cans in which they are to be packed and marketed. These cans may be sealed and "processed" by any suitable method for the preservation of contents, as is already well understood for the packing of meats, according to whatever meat is involved. Ordinarily the processing includes a cooking in the sealed can for an hour or more at a temperature which has the effect of sterilizing and preserving the contents until the can is opened. The can is solidly full with meat, air being excluded from all spaces between the meat fibers by the preparatory steps; and the liquid with which it has been customary to fill spaces between lumpy masses in a can is not needed because of the completeness with which the molded masses fill the can.

When opened, the product will be found attractive and palatable and need only be warmed for consumption. Assuming that the raw meat selected was of proper quality, and irreproachable except for dark appearance or toughness, it is found on opening that these two objectionable features have been eliminated, for the product has a sufficiently light color, and the toughness is not noticeable. The general separation of fine particles of meat with the filling of spaces between with the skimmed milk ingredient has the further effect of rendering the whole more palatable because less rich than if it were solid meat. Seasoning may be introduced into the materials at any suitable stage in the process, if desired; and although it has been suggested herein that the product is in condition for immediate use upon merely warming, it is obvious that it can be used as an ingredient in making other food products in the household if desired.

In the result, therefore, a product is made from meat and milk ingredients respectively costing, for example, seven cents and two cents a pound, or an average of four and one-half cents a pound, which is worth in the market much more than that cost of ingredients. As the values and utility of a product, in a practical sense, rest upon the willingness of people to purchase it, rather than on its mere suitability or nutritiousness, and are strongly affected by any popular feeling of repugnance, and as that which can be made at a low cost can be sold at a correspondingly low price, it follows that the invention opens a considerable field of benefit to people who feel the burden of the high cost of meat products under modern conditions. Inasmuch as the solids of the skimmed milk ingredient carries nearly all of the protein and carbo-hydrate values of the whole milk, and the treatment involved in the process of the invention is so simple, it becomes apparent that the invention provides also a new market for the casein of milk, a market which obviates the more expensive process now in vogue for marketing it in the form of cheese.

It is intended that the patent shall cover, by suitable expression in the appended claims, whatever features of patentable novelty exist in the invention disclosed.

I claim as my invention:—

1. A method of preparing and preserving food for market, comprising finely chopping and thoroughly mixing meat with milk and a little flour; filling the mixture into molds; subjecting the molds to heat, whereby is accomplished a slight shrinkage and skin formation without substantial change of form or size; filling cans with the masses thus molded; and sterilizing and sealing them.

2. A method of preparing and preserving food for market, comprising finely chopping and thoroughly mixing meat with milk; forming the pasty mixture into fractional masses; cauterizing the masses; thereby providing a skin sufficient to resist the breaking down action of the subsequent sterilizing process; filling cans therewith, said fractional masses being of such size as to fit and fill a can when assembled therein; and sterilizing and sealing.

3. A canned food product comprising a combination of finely chopped meat and milk, thoroughly mixed; in pasty condition and having a skin made from the material thereof and externally non-adhering.

Signed at Boston, Massachusetts, this 17th day of May, 1919.

RALPH W. CROCKER.